(12) United States Patent
Chavez

(10) Patent No.: US 9,000,906 B2
(45) Date of Patent: Apr. 7, 2015

(54) VICINITY MOTION DETECTOR-BASED OCCUPANT DETECTION AND NOTIFICATION SYSTEM

(76) Inventor: Alissa Marie Chavez, Albuquerque, NM (US)

(*) Notice: Subject to any disclaimer, the term of this patent is extended or adjusted under 35 U.S.C. 154(b) by 222 days.

(21) Appl. No.: 13/592,329

(22) Filed: Aug. 22, 2012

(65) Prior Publication Data
US 2013/0049946 A1   Feb. 28, 2013

Related U.S. Application Data

(60) Provisional application No. 61/575,514, filed on Aug. 22, 2011.

(51) Int. Cl.
| | |
|---|---|
| B60Q 1/00 | (2006.01) |
| G08B 23/00 | (2006.01) |
| G06F 17/10 | (2006.01) |
| A47C 7/62 | (2006.01) |
| B60K 28/00 | (2006.01) |
| B60N 2/00 | (2006.01) |
| B60N 2/26 | (2006.01) |

(52) U.S. Cl.
CPC ........ *B60Q 1/00* (2013.01); *B60N 2/002* (2013.01); *B60N 2/26* (2013.01)

(58) Field of Classification Search
USPC ................. 340/457.1, 573.1; 180/272, 374
See application file for complete search history.

(56) References Cited

U.S. PATENT DOCUMENTS

| | | | |
|---|---|---|---|
| 6,812,844 B1 * | 11/2004 | Burgess | 340/573.1 |
| 7,823,972 B2 * | 11/2010 | Browne et al. | 297/217.2 |
| 8,063,788 B1 * | 11/2011 | Morningstar | 340/667 |
| 8,217,796 B2 * | 7/2012 | Trummer | 340/573.1 |
| 8,477,024 B2 * | 7/2013 | Schoenberg et al. | 340/457 |
| 2008/0055064 A1 * | 3/2008 | Keith et al. | 340/457.1 |

\* cited by examiner

*Primary Examiner* — Fekadeselassie Girma
(74) *Attorney, Agent, or Firm* — Alberto A. León

(57) ABSTRACT

The present invention (also known as the HOT SEAT™) discloses and claims a vehicle occupant detection and alerting system comprising a vicinity motion detector capable sending a wireless transmission and a transmission receiving means capable of receiving the motion detector's wireless transmission and triggering a vehicle alarm system, vehicle horn, a mobile device or other form of notification if a child is left unattended in a vehicle.

1 Claim, 4 Drawing Sheets

VICINITY MOTION DETECTOR-BASED OCCUPANT DETECTION AND NOTIFICATION SYSTEM

CROSS-REFERENCE TO RELATED APPLICATION

Provisional Patent Application No. 61/575,514

STATEMENT REGARDING FEDERALLY SPONSORED RESEARCH AND DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

1. Field of the Invention

The invention relates generally to alerting systems. More particularly, the present invention relates to a vicinity motion detector-based alerting system. Even more specifically, the present invention relates to a portable vicinity motion detector-based occupant detection and notification system adaptable to a child vehicle restraining device.

2. Description of the Related Art Including Information Disclosed Under 37 CFR 1.97

Children, including infants and newborns, suffering injuries or death as a result of inadvertently or intentionally being left unattended in vehicles is a rapidly growing problem that affects America's youngest and most fragile population. Data received by the Centers for Disease Control ("CDC") from two independent agencies documented an estimated 9,160 nonfatal injuries and 78 fatal injuries among children aged ≤14 years who were left unattended in or around motor vehicles that were not in traffic between July, 2000 and June, 2001. Further, the number of fatalities among children left in vehicles either accidentally or intentionally is estimated to total 495 in the last twelve years. Accordingly, despite the advances in car technology and notification systems, the number of fatalities or serious injuries among children left unattended in vehicles continues to increase.

U.S. Pat. No. 7,012,533 to Younse discloses a temperature activated occupant detection and notification system. The present invention is distinguishable from the Younse system in a variety of other advantegeous ways. Besides being vicinity detector-based and not temperature activated, the present invention has fewer components which results in much easier manufacturing, packaging and transporting. In fact, the vicinity detection component of the present system is a single-unit, portable system that can be attached to a car seat, any other restraining device or to other parts of a motor vehicle. Unlike the Younse system, the present invention does not require sensors to be placed on the inside of the passenger door to open the passenger door upon detecting an unsafe temperature.

Another obvious advantage of the present invention over the detection and notification systems of the prior art is that it can be adapted and used with vehicles with or without alarm systems, as well as communicating with a synced mobile device. In the case of a vehicle equipped with an alarm system, that system can act as the notification component of the present invention. If the vehicle does not have an alarm system, then the vehicle's horn and/or lights can act as the notification system.

A further advantage of the system of the present invention is that it does not rely on external factors to be activated. As long as an unattended child is in the vicinity of the portable vicinity detector component of the invention, the alarm and notification component will be triggered.

SUMMARY OF THE INVENTION

The present invention (also known as the HOT SEAT™) comprises a vicinity motion detector-based detection system capable of triggering an alarm or other form of notification in a motor vehicle or mobile device if a child is left unattended therein. The system of the present invention is not temperature dependent, and does not rely on any other external factors in order to be activated. In other words, the inside temperature of the vehicle does not have to be unsafely high or low for the detection of the present invention to trigger the alarm and notification components. All that is required is for a child to be left unattended or on about a car seat or other restraining device.

The present invention does not comprise a sensor(s) that would require opening a passenger door for two reasons: (1) research has shown that if a child is left in a vehicle for any length of time with a window open or a door open the child is still in danger; and (2) opening a car door while a child is left unattended inside a vehicle can result in other potentially dangerous situations. For example, such scenario could allow a stranger (potentially a criminal) to remove the child from the vehicle. It is also a well-known fact that the temperature inside a vehicle raises at an extremely high rate, even if a door or window is cracked or open.

Instead of relying on changes in external factors, such as temperatures, the present invention discloses and claims a system that uses an alarm and/or other features of the car to notify anyone around the vehicle, including the person holding the vehicle's keys, that a child has been left unattended inside the vehicle. The present invention works in under one minute from the time the child has been left unattended, so there is little or no danger that the temperature inside the vehicle will be unreasonably high before the child is safely extracted from the vehicle.

The Hot Seat alarm comprises a vicinity motion detector. A vicinity motion dectector is similar to a regular motion detector, with some important differences. The main difference between the vicinity motion detector and a regular motion detector is that for the vicinity motion detector to be activated the child does not have to be in motion. Instead, activation takes place if the child is in the vicinity of the vicinity motion detector. The child's mere presence in the vicinity of the detector suffices to activate the system. For a motion dectector to be activated the child would have to be moving. Accordingly, the detection and notification system of the present invention works even if the unattended child is sleeping or immobile.

The vicinity motion detector is more accurate than a motion detector because the child does not have to be moving for the sensor to sense that the child is in the seat. The sensor senses if the child is in the vicinity of the car seat or other restraining device. Upon the vicinity sensor detecting that the child is on the seat or its vicinity, the sensor causes the alarm or other notification system(s) to be activated.

For the preferred embodiment of the Hot Seat to be activated, the vehicle must be on the off position and the doors must be locked. Once a child is detected, the alarm will sound and will notify people around the vehicle that a child was left in his/her car seat. In the event that the vehicle's keys are left in the ignition, with the vehicle running and the child inside the vehicle, alternative embodiments of the invention would allow activation of the Hot Seat if a pre-determined air flow is not occurring, a pre-determined temperature is not reached or surpased, or if the vehicle is not moving after a pre-determined amount of time.

DETAILED DESCRIPTION OF THE INVENTION

Figure 3:
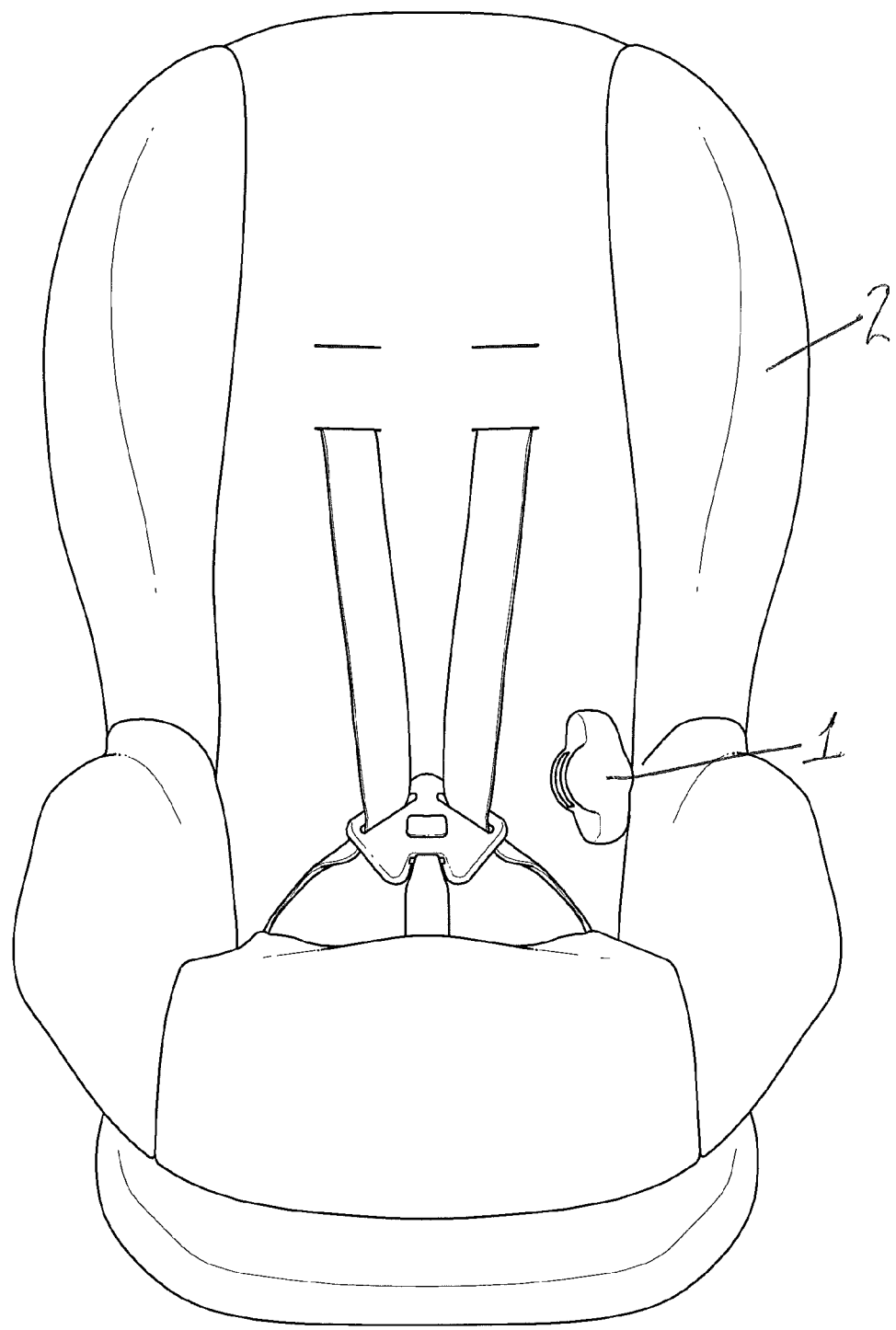
FIG. 3 shows the vicinity detection means secured to an unoccupied child restraining device.
Figure 4:
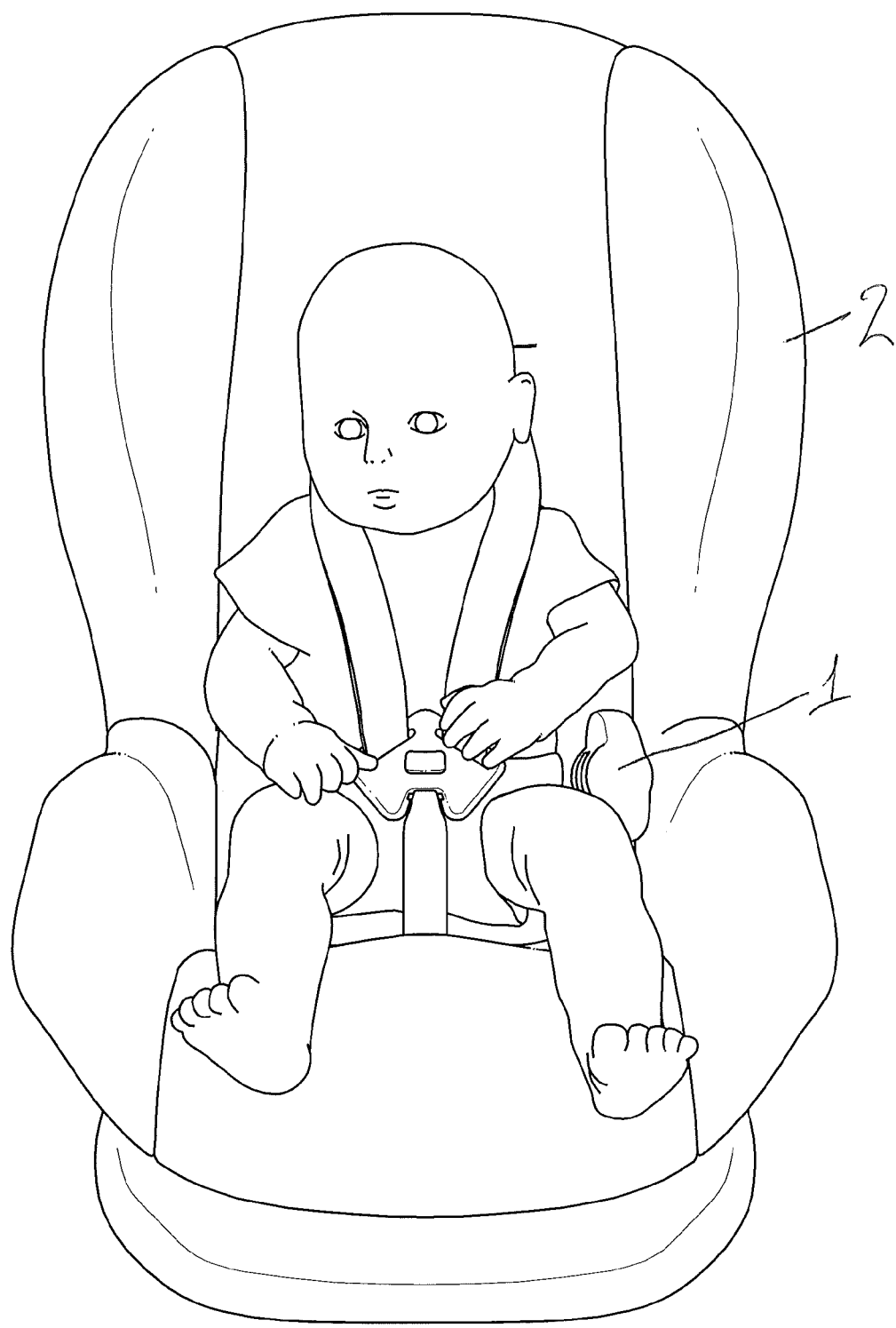
FIG. 4 shows the vicinity detection means secured to an occupied child restraining device.

The present invention comprises a motion vicinity detector (1) that can be affixed to a child car seat (2), as illustrated in FIGS. 3 and 4, a seat belt or similar car restraint. The motion vicinity detector is capable of sending a wireless transmission. The invention also comprises a transmission receiving means capable of receiving the wireless transmission. The receiving means is capable of alerting passersby to the presence of a child in the vehicle by means of auditory and/or visual cues, such as a text or alarm on a mobile device, activation of the vehicle alarm system, vehicle lights, vehicle turn signals, vehicle horn and/or vehicle sound system.

Figure 2:
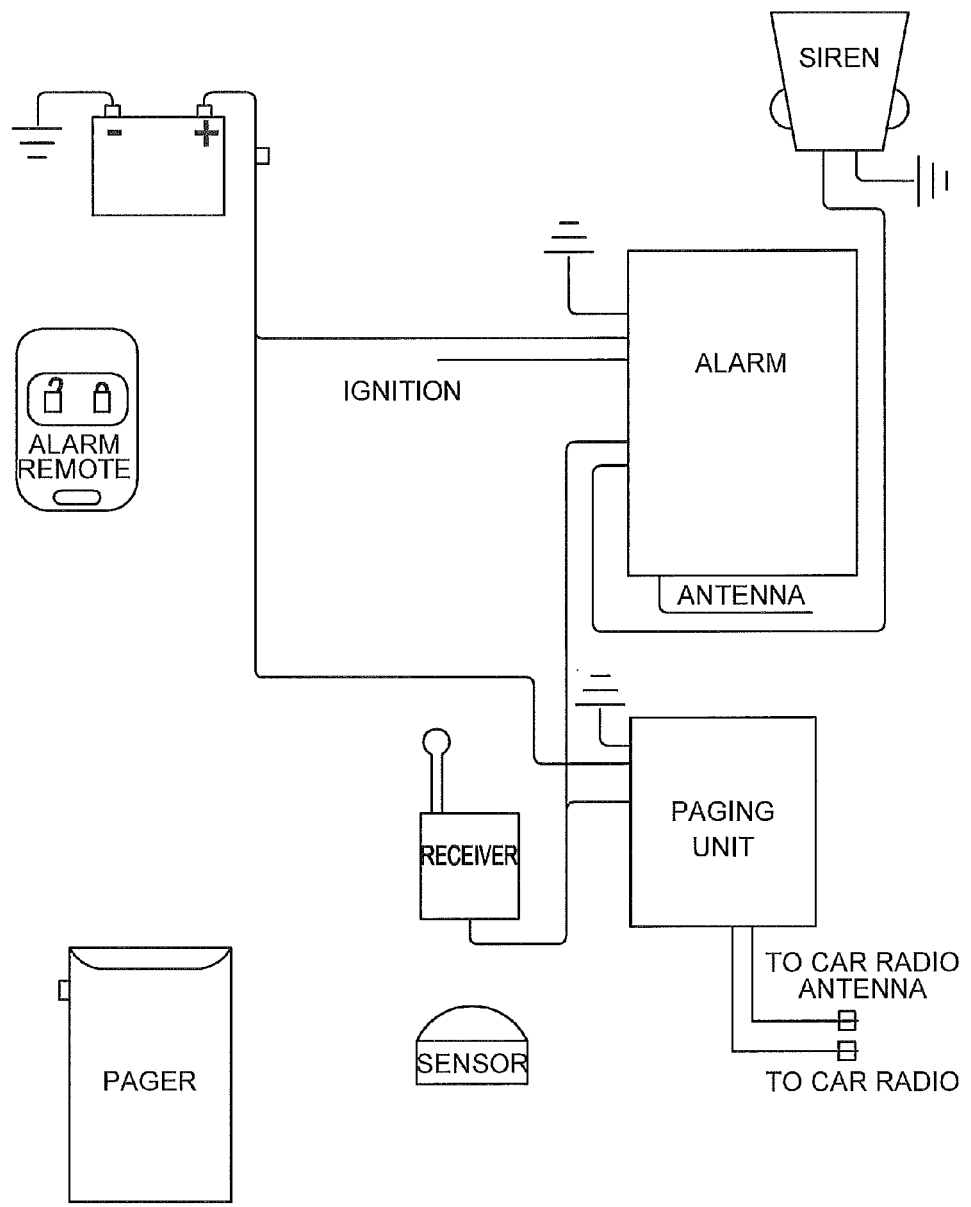
FIG. 2 shows a diagram of the system of the present invention as adapted to a vehicle with an alarm system.

The preferred embodiment of the invention comprises a vicinity motion detector capable of communicating with the alarm system of a vehicle, as depicted in FIG. 2, wirelessly through a receiver. The vehicle's alarm system comprises a receiver capable of receiving a wireless signal from the vicinity motion detector. The receiver of the present invention is further capable of communicating with and triggering a paging unit, the vehicle's alarm system, and one or more mobile devices. The paging unit is capable of communicating with and of triggering the vehicle's alarm and of turning on the vehicle's radio and antena. Wireless mobile devices, such as cellular phones and tablets, can receive wireless signals from the vicinity motion detector using Bluetooth™ or similar wireless technology.

Figure 1:
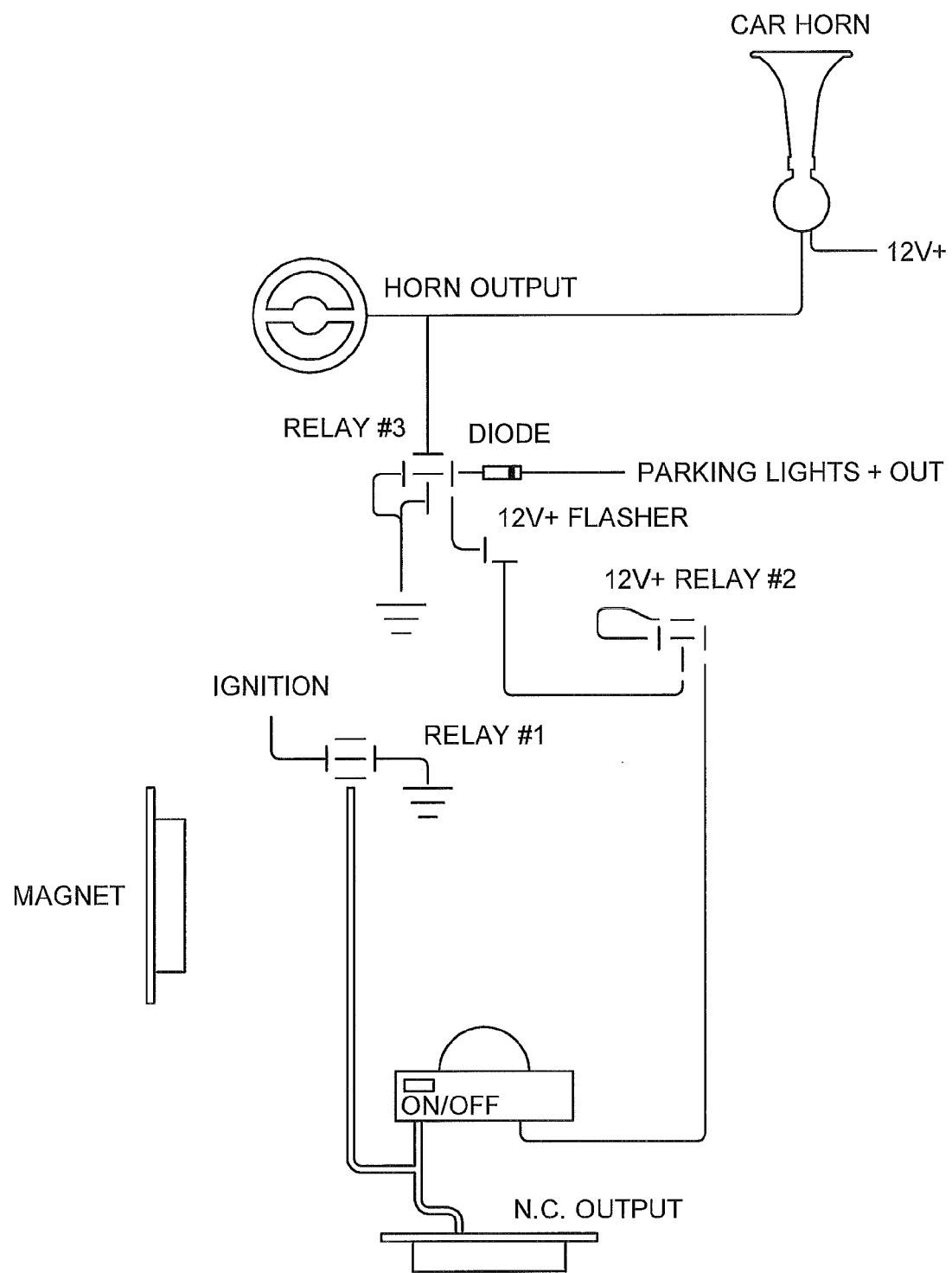
FIG. 1 shows a diagram of the system of the present invention as adapted to a vehicle without an alarm system.

The embodiment of the invention adaptable to a vehicle without an alarm system is depicted in FIG. 1. In that embodiment of the invention, the vicinity motion detector comprises a magnetic off and on switch and is capable of being automatically armed when the vehicle's ignition is turned off. Once armed, the vicinity motion detector is capable of sending a trigger to a first relay. The first relay in turn is capable of powering the vehicle's turn signal flasher which in turn triggers a second relay capable of powering the vehicle's parking lights in a flashing mode. The parking lights are capable of triggering a third relay which is capable of powering the vehicle's horn. That embodiment of the invention also comprises a magnetic component capable of turning off the vicinity motion detector upon being waved near the vicinity motion detector's magnetic switch. The vicinity motion detector is further capable of staying in the off position if within a pre-determined period of time (20-30 seconds) unless the user opens the vehicle door and turns the ignition to the "on" position. Failure to take that final step would automatically turn the vicinity motion detector back to the "on" position thus triggering the notification systems.

Alternative embodiments of the present invention would be available to cover eventualities that can arise while using the invention. For example, in the unlikely event that a user of the present invention leaves the car keys in the ignition and the car is running while a child is in the range of the vicinity motion detector, the present invention would comprise a timer built in to the driver's seat that would detect that there is no driver occupying the seat. After a pre-determined amount of time, the timer would then send a signal capable of turning off the vehicle's ignition. Once the ignition is turned off, the system of the present invention would activate, thus arming the notification system which would then trigger the alarm or other notification device upon detecting that a child is in the range of the vicinity motion detector as set forth above in the preferred embodiment of the invention.

The vicinity motion detector of the present invention can be adapted to existing child restraining devices usable for any size or weight children, or can be placed in those devices in the manufacturing process.

Generally, although the present invention has been described in detail with particular reference to the above preferred embodiment(s), other embodiments can achieve the same results. Variations and modifications of the present invention will be obvious to those skilled in the art and it is intended to cover all such modifications and equivalents. The entire disclosures of any references, applications, patents, and publications cited above and/or in the attachments, and of the corresponding application(s), are hereby incorporated by reference.

What I claim is:

1. A vehicle occupant detection and alerting system adapted to a vehicle not equipped with an alarm system comprising:
   a. a vicinity motion detector comprising a magnetic off and on switch, the detector being automatically armed when the vehicle's ignition is turned off and, once armed, the detector further-sends a trigger signal;
   b. a wireless transmitter that sends a signal to one or more synced mobile devices;
   c. a first relay that receives a trigger signal from the detector and further powers the vehicle's turn signal flasher, the turn signal flasher then sends a trigger signal;
   d. a second relay that receives a signal from the turn signal flasher and further powers the vehicle's parking lights in a flashing mode, the parking lights then send a trigger signal;
   e. a third relay that receives a signal from the parking lights and further triggers powering the vehicle's horn;
   f. a magnetic means that turns off the vicinity motion detector upon being waved near the vicinity motion detector's magnetic off and on switch;
   g. the vicinity motion detector further stays in the "off" position if within a pre-determined period of time unless the user opens the vehicle door and turns the vehicle's ignition to the "on" position and, if the user fails to take that final step, the detector automatically turns back to the "on" position thus triggering the notification systems.

* * * * *